W. V. TURNER.
LOCOMOTIVE BRAKE SYSTEM.
APPLICATION FILED MAY 20, 1918.
1,318,245.
Patented Oct. 7, 1919.
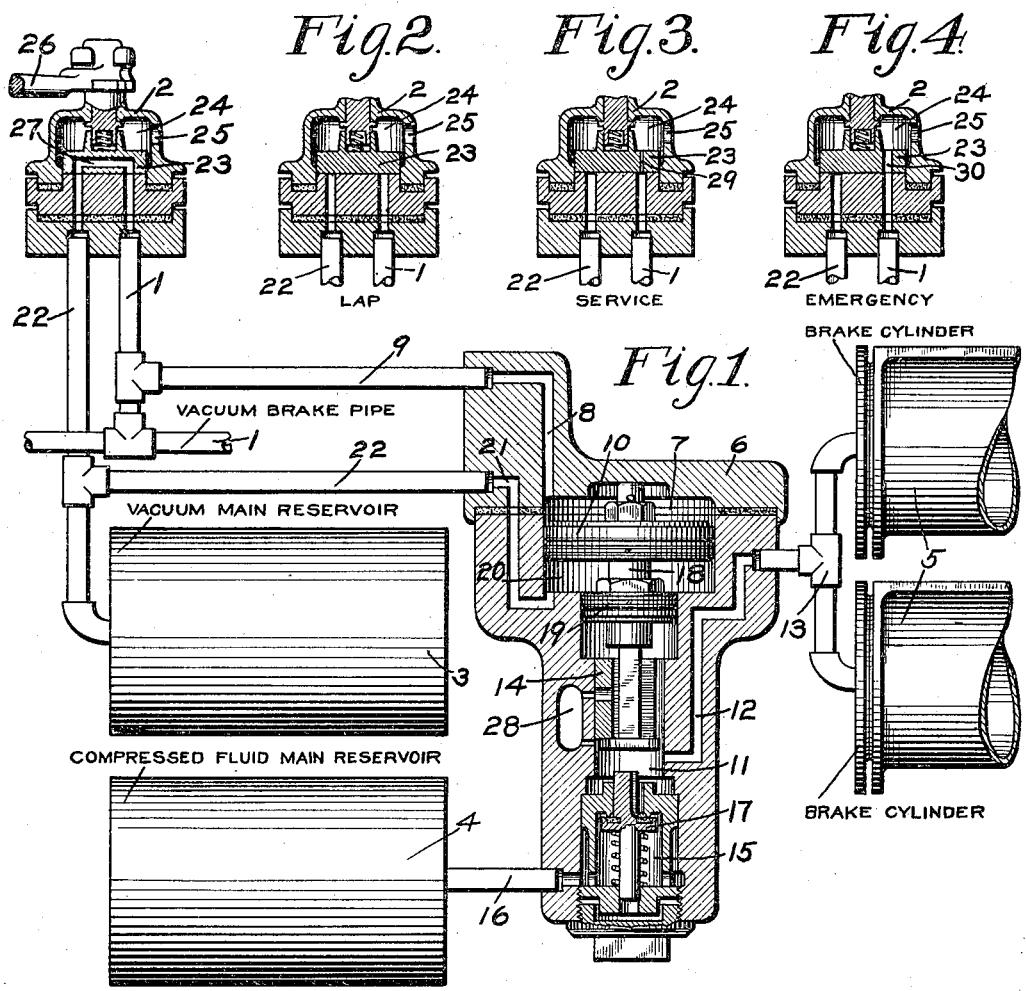
INVENTOR
Walter V. Turner
by Wm. M. Cady
Att'y.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LOCOMOTIVE BRAKE SYSTEM.

1,318,245.      Specification of Letters Patent.      Patented Oct. 7, 1919.

Application filed May 20, 1918. Serial No. 235,608.

*To all whom it may concern:*

Be it known that I, WALTER V. TURNER, a citizen of the United States, residing at Wilkinsburg, in the county of Allegheny and State of Pennsylvania, have invented new and useful Improvements in Locomotive Brake Systems, of which the following is a specification.

This invention relates to fluid pressure brakes, and more particularly to a locomotive brake equipment.

There is a type of fluid pressure brake known as the vacuum brake, in which a partial vacuum is normally maintained in a vacuum brake pipe and in which the brakes are applied when atmospheric pressure is admitted to the brake pipe.

As well known, in the usual fluid pressure brake system, the brake pipe is normally charged with fluid under pressure and the brakes are applied by venting fluid from the brake pipe.

In places where cars are already equipped with the vacuum brake, it would be advantageous in some cases, to have the locomotive provided with a brake equipment adapted to control the brakes both where the cars are equipped with the vacuum brake and where the automatic compressed air brake system is used.

The principal object of my invention is to provide a locomotive brake equipment in which the manipulation of the apparatus to control vacuum brakes on the cars operates to control compressed air brakes on the locomotive.

In the accompanying drawing; Figure 1 is a diagrammatic view partly in section, of a locomotive brake equipment embodying my invention; Fig. 2 a sectional view of the brake valve in lap position; Fig. 3 a sectional view of the brake valve in service application position; and Fig. 4 a sectional view of the brake valve in emergency application position.

As shown in the drawing, the locomotive brake equipment may comprise a vacuum brake pipe 1 for controlling the vacuum brakes on the cars of the train, a brake valve 2 for varying the pressure in the vacuum brake pipe, a vacuum reservoir 3, adapted to be normally subject to a partial vacuum or fluid pressure less that atmospheric pressure, a compressed fluid main reservoir 4, adapted to be normally charged with fluid under pressure, locomotive brake cylinders, and a valve device 6, adapted to be operated by variations in pressure in the vacuum brake pipe for controlling compressed air brakes on the locomotive.

The valve device 6 may comprise a casing having a piston chamber 7 connected by passage 8 and pipe 9 to the vacuum brake pipe 1 and containing a piston 10, a valve chamber 11, connected by passage 12 and pipe 13 to the locomotive brake cylinders 5 and containing an exhaust slide valve 14, and a valve chamber 15, connected by pipe 16 to the compressed fluid main reservoir 14 and containing a puppet type application valve 17.

On the piston stem 18, intermediate the valve 14 and the piston 10, is a differential piston 19, subject on one side to the pressure in a chamber 20, which is connected by passage 21 and pipe 22 with vacuum main reservoir 3, and on the opposite side to locomotive brake cylinder pressure in valve chamber 11.

The brake valve 2 may comprise a rotary valve 23 contained in valve chamber 24, open to an atmospheric port 25, and adapted to be operated by a handle 26 for varying the pressure in the vacuum brake pipe 1.

In operation, the brake valve 2 being in running position, as shown in Fig. 1 of the drawing, a cavity 27 in the rotary valve 23 connects the vacuum reservoir pipe 22 with the vacuum brake pipe 1, and the pressure in the vacuum brake pipe 1 is therefore normally maintained at the partial vacuum of the vacuum reservoir 3.

The piston chamber 7 of the valve device 6 being connected to the vacuum pipe 9 while the chamber 20 is connected to the vacuum reservoir 3, the fluid pressures on opposite sides of the piston 10 will be equal, and the higher atmospheric pressure in valve chamber 11, acting on piston 19 will operate the piston, so as to maintain the exhaust slide valve 14 in release position, in which the valve chamber 11 and the locomotive brake cylinders 5 are connected to the exhaust port 28.

If it is desired to effect a service vacuum brake application of the cars, the brake valve handle is turned to service position, as shown in Fig. 3 of the drawing, in which the vacuum brake pipe 1 is connected, by a restricted port 29 in the rotary valve 23, with valve chamber 24.

Fluid at atmospheric pressure is then admitted to the vacuum brake pipe to effect an application of the brakes on the train and atmospheric pressure is also admitted to the piston chamber 7 of valve device 6. Piston 10 is thereupon actuated, so as to move the slide valve 14, first closing the exhaust port 28, and then by a further movement of the piston, the application valve 17 is opened, to admit fluid under pressure from the reservoir 4 to valve chamber 11 and the locomotive brake cylinders 5.

When the desired brake application has been obtained, the brake valve is turned to lap position, as shown in Fig. 2 of the drawing, in which the vacuum brake pipe is blanked.

On the locomotive, when the brake cylinder pressure has been increased to a predetermined degree, the pressure acting in valve chamber 11 on the piston 19 will operate said piston, so as to permit the valve 17 to close, but without opening the exhaust port 28 to the valve chamber 11.

Should leakage from the locomotive brake cylinders occur, while the brake valve is held in lap position, the equilibrium of pressures on the pistons 10 and 19 will be changed, so that the pistons will be operated to again open the valve 17 and thereby supply fluid under pressure to the locomotive brake cylinders, until the equilibrium is again restored, when the pistons 10 and 19 will be operated to permit the valve 17 to close.

The brakes may be released by moving the brake valve 2 to running position, in which the vacuum brake pipe 1 is connected to the vacuum reservoir 3, so that the partial vacuum in the vacuum brake pipe is restored and the brakes on the cars released.

On the locomotive, the restoration of the partial vacuum in piston chamber 7, causes the brake cylinder pressure in valve chamber 11 to operate the pistons 10 and 19, so as to move the slide valve 14 and connect the valve chamber 11 and the locomotive brake cylinders 5 with the exhaust port 28.

An emergency application of the brakes may be effected by turning the brake valve handle 26 to emergency position, as shown in Fig. 4 of the drawing, in which a large port 30 in the rotary valve 23 connects the valve chamber 24 with the vacuum brake pipe.

A rapid increase in pressure in the vacuum brake pipe is thus produced to cause an emergency application of the brakes. In this case, the valve device 6 operates as in a service application of the brakes, except that the more rapid increase in pressure in piston chamber 7 causes a greater movement of the application valve 17 and a more rapid supply of fluid to the locomotive brake cylinders.

It will be evident that having an equipment of the above character on the locomotive, the locomotive may also be equipped with a separate automatic compressed fluid pressure brake apparatus, of the usual type, so that in case the locomotive is connected to cars equipped with automatic compressed fluid brakes, the brakes may be controlled on the locomotive and cars by varying the pressure in a brake pipe normally charged with fluid under pressure.

Having now described my invention, what I claim as new and desire to secure by Letters Patent, is:—

1. The combination with a vacuum brake pipe and a reservoir having a partial vacuum and normally connected to said pipe, of a reservoir containing fluid under pressure, a brake cylinder, and means operated upon an increase in pressure in the vacuum brake pipe for supplying fluid from the compressed fluid reservoir to the brake cylinder.

2. The combination with a vacuum brake pipe, of a reservoir containing fluid under pressure, a brake cylinder, a valve for controlling the supply of fluid from said reservoir to the brake cylinder, and a piston device subject to the opposing pressures of the vacuum brake pipe and the brake cylinder for operating said valve.

3. The combination with a vacuum brake pipe, of a reservoir containing fluid under pressure, a brake cylinder, a valve for controlling the supply of fluid from said reservoir to the brake cylinder, and a differential piston subject to the opposing pressures of the vacuum brake pipe and the brake cylinder for operating said valve.

4. The combination with a vacuum brake pipe and a vacuum reservoir containing a partial vacuum and normally connected to said reservoir, of a compressed fluid reservoir, a brake cylinder, a valve for controlling the supply of fluid from the compressed fluid reservoir to the brake cylinder, and a differential piston subject on one side to vacuum brake pipe pressure and on the opposite side to vacuum reservoir pressure and the pressure in the brake cylinder for operating said valve.

In testimony whereof I have hereunto set my hand.

WALTER V. TURNER.